Patented June 12, 1945

2,378,210

UNITED STATES PATENT OFFICE 2,378,210

PROCESS FOR THE SYNTHESIS OF TOLUENE AND XYLENES

Donald L. Fuller and Bernard S. Greensfelder, Oakland, Calif., assignors to Shell Development Company, San Francisco, Calif., a corporation of Delaware No Drawing. Application November 17, 1942, Serial No. 465,924

12 Claims. (Cl. 260—668)

This invention relates to a new and useful process for the synthesis of toluene and xylenes. A particular embodiment of the invention relates to a process for the synthesis of toluene by catalytic dehydroisomerization of dimethyl cyclopentane and/or ethyl cyclopentane.

In copending application Serial No. 449,971, filed July 6, 1942, we have shown that molybdenum oxide is a unique dehydrogenation catalyst in that it is capable of effecting a direct dehydroisomerization of methyl cyclopentane to benzene and have described a method for the synthesis of benzene from methyl cyclopentane utilizing this reaction. It is found that this unique ability of molybdenum oxide is not confined to the dehydroisomerization of methyl cyclopentane but extends to the dehydroisomerization of other non-hydroaromatic naphthene hydrocarbons. Thus, the dimethyl cyclopentanes, ethyl cyclopentane and cycloheptane may be directly dehydroisomerized to toluene, and the trimethyl cyclopentanes, methyl cycloheptane and the methyl ethyl cyclopentanes may be directly dehydroisomerized to xylenes. The present application describes a process wherein this property of molybdenum oxide catalysts is used to synthesize these methyl substituted benzenes, particularly toluene.

According to the process of the present invention, methyl substituted benzenes such, in particular, as toluene and/or xylenes are synthesized directly from non-hydroaromatic cycloparaffin hydrocarbons having at least seven carbon atoms. The cycloparaffin may be applied in a pure state, in admixture with one or more other non-hydroaromatic cycloparaffins, or in admixture with minor amounts of other hydrocarbons such as paraffins, olefins and/or aromatics. The non-hydroaromatic cycloparaffins are, however, preferably present in amounts exceeding 50% by volume. The non-hydroaromatic cycloparaffin or mixture consisting predominantly of non-hydroaromatic cycloparaffins may be derived from any source. In some cases it is possible by careful fractional distillation to separate a narrow boiling fraction consisting predominantly of dimethyl cyclopentanes from gasolines of natural or synthetic origin. Such fractions boil predominantly within the range of 185° F. and 200° F. In many cases, however, it is impossible or impractical to separate a fraction consisting predominantly of the desired non-hydroaromatic cycloparaffins from petroleum fractions by simple fractional distillation. Suitable fractions may, however, be obtained by certain combination processes. In one such combination process a petroleum fraction containing appreciable concentrations of the desired non-hydroaromatic cycloparaffin is subjected to a dehydrogenation treatment, for instance, with a dehydrogenating metal sulfide catalyst to dehydrogenate the hydroaromatic cycloparaffin hydrocarbons usually present; any aromatic hydrocarbons are extracted by known methods; and then the large amounts of paraffins are reduced to a minor proportion, for instance, by extraction or cracking, or dehydrocyclization followed by a fractionation or extraction. The residual material consisting predominantly of non-hydroaromatic cycloparaffins is a suitable feed for the present synthesis.

According to another method, certain hydrocarbon fractions obtained by destructive hydrogenation processes and consisting predominantly of cycloparaffins are subjected to the above-described dehydrogenation treatment and extraction treatment to remove aromatic hydrocarbons. By this method, fractions consisting essentially of non-hydroaromatic hydrocarbons may be prepared.

The described dehydroisomerization requires the use of specific catalysts. Of the many dehydrogenation catalysts such as chromium oxide, tungsten oxide, vanadium oxide, titanium oxide, iron oxide, platinum, nickel, etc., the only catalysts so far found to afford the desired results are molybdenum oxide and, to a lesser extent, molybdenum sulfide. Certain observations indicate that a tungsten sulfide-nickel sulfide mixture catalyzes dehydroisomerization to a slight degree. The catalyst may be employed per se or in combination with one or more promoting and/or carrying and/or diluting substances. A preferred catalyst comprises an adsorptive support (for example, having a surface area of 30 or more square meters per gram) impregnated with an effective amount of the molybdenum oxide. Suitable adsorptive supports comprise, for instance, active carbon, active magnesia, various active clays, and, especially, active aluminas. Particularly effective molybdena-alumina catalysts are described and claimed in copending applications Serial Nos. 452,552, 452,656, and 463,306, filed July 27, 1942, July 28, 1942, and October 23, 1942, respectively. Effective amounts of the molybdenum oxide to be applied to such carrier or supporting substances are, for instance, about 4% to about 30% (i. e., 3% to 22.5% molybdenum).

The direct dehydroisomerization of the above-described non-hydroaromatic cycloparaffin hydrocarbons with the above-described molybdenum oxide catalysts may be effected under conditions within the following approximate limits:

| | |
|---|---|
| Temperature °C | 450 to 550 |
| Pressure atmospheres | 2 to 60 |
| Liquid hourly space velocity | 0.1 to 2 |
| Partial pressure of hydrogen atmospheres | 1 to 50 |

If molybdenum sulfide is employed instead of molybdenum oxide, somewhat lower temperatures between about 350° C. and 450° C. are preferred. By liquid hourly space velocity is meant the volumes of liquid hydrocarbon contacted (in the vapor form) per volume of catalyst per hour. Thus, a liquid hourly space velocity of 1 signifies that for every volume of reactor space filled with catalyst there is fed during one hour the vapors of an equal volume of the liquid hydrocarbon feed. The above-mentioned factors governing the conditions are interdependent as they are in most all catalytic reactions. The ranges given are therefore not to be taken as rigidly fixed or absolutely limited but only indicative of bounds outside of which it is ordinarily unnecessary to go in practicing the invention. The conditions with respect to any of the above governing factors which will be optimum under any given set of circumstances will depend upon the conditions with respect to the other factors as well as upon the particular hydrocarbon feed, the age of the catalyst, etc., but will ordinarily fall within the above limits. In no case are all of the conditions made so severe that appreciable destructive hydrogenation takes place. The above-specified conditions are hereinafter referred to as dehydroisomerization conditions. One set of dehydroisomerization conditions which may be advantageously employed with the preferred molybdenum oxide catalyst is, for example:

| | |
|---|---|
| Temperature °C | About 490 |
| Pressure atmospheres | About 15 |
| Liquid hourly space velocity | About 0.5 |
| Partial pressure of hydrogen atmospheres | About 7 |

When treating the above-described non-hydroaromatic cycloparaffin hydrocarbons as indicated, the predominant reaction is the direct dehydroisomerization of the applied non-hydroaromatic cycloparaffin hydrocarbons to the corresponding aromatic hydrocarbons. Side reactions such as cracking and condensation to polynuclear hydrocarbons, etc., take place only to a minor extent. The conversion products therefore consist essentially of the desired alkyl benzenes with lesser amounts of polynuclear aromatic hydrocarbons.

The catalytic treatment may be effected in any one of the known suitable manners for effecting similar reactions such as hydroforming with similar catalysts. Thus, the catalyst may be employed in a granular, pelleted or finely divided form in converters of suitable design for such catalysts. One suitable method is, for example, to support the catalyst in the granular or pelleted form in a reaction converter provided with heating and temperature controlling means and to pass the vaporized non-hydroaromatic cycloparaffin hydrocarbons in admixture with from, for example, 2 to 5 volumes of hydrogen therethrough. The catalyst is periodically regenerated by burning off deposited carbonaceous matter with oxygen or an oxygen-containing gas in the known manner.

*Example I*

A highly naphthenic straight run petroleum fraction was carefully fractionated and a fraction boiling between 88° C. and 93° C. (5% and 95% points in a precision distillation over at least 20 theoretical plates) was collected. This fraction consisted predominantly of a mixture of dimethyl cyclopentanes with minor amounts of paraffins and about 17% of methyl cyclohexane. This fraction was subjected to a dehydroisomerization treatment with a molybdenum oxide-on-alumina catalyst (14% Mo) under the following conditions:

| | |
|---|---|
| Temperature °C | 490 |
| Pressure atmospheres | 10 |
| Contact time seconds | About 100 |
| Liquid hourly space velocity | 0.2 |
| Mol ratio of hydrogen to hydrocarbon in feed | 3 |

The product from the first three hours of processing contained about 70% b. w. aromatic hydrocarbons, and the product from the tenth to the twelfth hour of processing contained about 59% b. w. aromatic hydrocarbons.

*Example II*

A second portion of the material described in Example I was treated with the catalyst under the same conditions except that the pressure was maintained at 5 atmospheres and the liquid hourly space velocity was reduced to 0.1. The product from ten hours of processing contained about 83% b. w. aromatic hydrocarbons, predominantly toluene.

We claim as our invention:

1. A process for the synthesis of toluene which comprises contacting hydrocarbon vapors consisting predominantly of dimethyl cyclopentanes under dehydroisomerization conditions with a catalyst consisting essentially of a major amount of an adsorptive alumina impregnated with a minor amount of molybdenum oxide.

2. A process for the synthesis of toluene which comprises contacting hydrocarbon vapors consisting predominantly of non-hydroaromatic cycloparaffin hydrocarbons having seven carbon atoms under dehydroisomerization conditions with a catalyst consisting essentially of a major amount of an adsorptive alumina impregnated with a minor amount of molybdenum oxide.

3. A process for the synthesis of toluene which comprises contacting hydrocarbon vapors consisting predominantly of non-hydroaromatic cycloparaffin hydrocarbons having seven carbon atoms under dehydroisomerization conditions with a molybdenum oxide-alumina catalyst.

4. A process for the synthesis of toluene which comprises contacting hydrocarbon vapors consisting predominantly of ethylcyclopentane under dehydroisomerization conditions with a molybdenum oxide catalyst.

5. A process for the synthesis of toluene which comprises contacting hydrocarbon vapors consisting predominantly of dimethyl cyclopentanes under dehydroisomerization conditions with a molybdenum oxide catalyst.

6. A process for the synthesis of toluene which comprises contacting hydrocarbon vapors consisting predominantly of non-hydroaromatic cycloparaffin hydrocarbons having seven carbon atoms under dehydroisomerization conditions with a molybdenum oxide catalyst.

7. A process for the synthesis of a methyl substituted benzene which comprises contacting hydrocarbon vapors consisting predominantly of non-hydroaromatic cycloparaffin hydrocarbons having at least seven carbon atoms under dehydroisomerization conditions with a catalyst consisting essentially of a major amount of an adsorptive alumina impregnated with a minor amount of molybdenum oxide.

8. A process for the synthesis of xylenes which comprises contacting hydrocarbon vapors consisting predominantly of non-hydroaromatic cycloparaffin hydrocarbons having eight carbon atoms under dehydroisomerization conditions with a molybdenum oxide catalyst.

9. A process for the synthesis of a methyl substituted benzene which comprises contacting hydrocarbon vapors consisting predominantly of non-hydroaromatic cycloparaffin hydrocarbons having at least seven carbon atoms under dehydroisomerization conditions with a molybdenum oxide-alumina catalyst.

10. A process for the synthesis of a methyl substituted benzene which comprises contacting hydrocarbon vapors consisting predominantly of non-hydroaromatic cycloparaffin hydrocarbons having at least seven carbon atoms under dehydroisomerization conditions with a molybdenum oxide catalyst.

11. A process for the synthesis of a methyl substituted benzene which comprises contacting hydrocarbon vapors consisting predominantly of non-hydroaromatic cycloparaffin hydrocarbons having at least seven carbon atoms under dehydroisomerization conditions with a molybdenum sulfide catalyst.

12. A process for the synthesis of a methyl substituted benzene which comprises contacting hydrocarbon vapors consisting predominantly of non-hydroaromatic cycloparaffin hydrocarbons having at least seven carbon atoms under dehydroisomerization conditions with a catalyst containing as the predominant active constituent a compound of molybdenum selected from the group consisting of molybdenum oxide and molybdenum sulfide.

DONALD L. FULLER.
BERNARD S. GREENSFELDER.